(12) United States Patent
Stall

(10) Patent No.: US 7,784,059 B2
(45) Date of Patent: Aug. 24, 2010

(54) STATELESS ASYNCHRONOUS MESSAGE TRANSMISSION

(75) Inventor: J. Michael Stall, Bothell, WA (US)

(73) Assignee: Microsoft Corporation, Redmond, WA (US)

(*) Notice: Subject to any disclaimer, the term of this patent is extended or adjusted under 35 U.S.C. 154(b) by 1035 days.

(21) Appl. No.: 11/466,268

(22) Filed: Aug. 22, 2006

(65) Prior Publication Data

US 2008/0127202 A1     May 29, 2008

(51) Int. Cl.
    *G06F 3/00*      (2006.01)

(52) U.S. Cl. ...................... 719/311; 719/313

(58) Field of Classification Search ........................ None
See application file for complete search history.

(56) References Cited

U.S. PATENT DOCUMENTS

| | | | | |
|---|---|---|---|---|
| 5,632,032 A | * | 5/1997 | Ault et al. | 718/100 |
| 2004/0139432 A1 | * | 7/2004 | Bender et al. | 718/100 |
| 2004/0221271 A1 | * | 11/2004 | Zeman et al. | 717/127 |
| 2005/0013257 A1 | * | 1/2005 | Garyfalos et al. | 370/252 |
| 2007/0266392 A1 | * | 11/2007 | Thoelke | 719/313 |

FOREIGN PATENT DOCUMENTS

WO    WO 2005096148 A2 * 10/2005

* cited by examiner

*Primary Examiner*—Hyung S Sough
*Assistant Examiner*—Carina Yun
(74) *Attorney, Agent, or Firm*—Workman Nydegger

(57) ABSTRACT

In one embodiment of this invention, a computer system performs a method for stateless asynchronous message transmission. The method involves a first software application instantiating a listener communication thread for communication with a process of a second software application. The method involves receiving an event notification from a sender communication thread, then suspending the sender communication thread in the second process while the second process continues running. The method involves storing a thread identifier of the suspended sender communication thread and the memory address of an event message within the event notification. The method involves writing information to the suspended sender communication thread during the suspension of the sender communication thread to change values that are provided to the second software application. Lastly, the method involves resuming the sender communication thread subsequent to writing the information, thereby instructing the second process of the second application to process the written information.

17 Claims, 4 Drawing Sheets

STATELESS ASYNCHRONOUS MESSAGE TRANSMISSION

BACKGROUND

Computers are used to perform a variety of tasks. Computers typically accomplish tasks using by processing software applications. Often, computer users desire to communicate with other computer systems or with other computer users. Many software applications facilitate intercommunication with other computer systems or other computer users. Most software applications capable of communication with other computer systems rely heavily on operating system (OS) resources. OS resources may include device drivers, hard drive read/write functions, processor allocation, processes, data files, and other resources provided by the OS.

Many software applications utilize OS resources by means of processes and threads. For example, in order to accomplish Task A, the software application may instantiate one or more processes where each process is intended to perform one or more tasks. Moreover, each process may instantiate threads to accomplish subtasks within the process. For example, if Task A was an Instant Messaging (IM) application, the (IM) application may initiate a process to initiate and control communication between the IM application and a separate (possibly remote) IM application. The communication process may initiate a thread to control, for example, notification of when a message has been sent or has arrived. Complex processes may instantiate a large number of threads. These threads can be any type of thread including kernel threads, user threads, primary threads, or other types. The above example is a simplistic overview of how an IM application may implement processes and threads. Actual IM and other applications may use hundreds or thousands of processes and/or threads to accomplish various tasks.

Software applications cannot, however, use an unlimited number of processes and threads to accomplish the tasks envisioned by the developer. Software applications consume computer system resources. Computer system resources may include processing time, random access memory (RAM) and page-file usage, hard-drive storage space, bus use, controllers, and other computer system resources. Applications, such as an IM application often require the use of multiple computer system resources. As a result, software application developers typically aim to keep computer system resource requirements to a minimum. Many times, however, the magnitude of the application (i.e. the large number of available functions) leads a developer to use more computer system resources than otherwise preferred.

Problems may arise when multiple processes are initiated. For example, when multiple processes are involved, security problems may be introduced such as man-in-the-middle attacks. Other problems include remoteability. For example, if one process needs to communicate with another process and that process is located on a remote computer system. Traditional software communication between processes or applications typically involves multiple resource-consuming processes. Such processes include user level inter-process communication (IPC), access control lists (ACLs), additional security modules, kernel objects, application programming interfaces (APIs) and other resources that must be organized and released at the end of the communication.

BRIEF SUMMARY

Embodiments of the present invention are directed to systems, methods, and computer program products for stateless asynchronous message transmission. In one embodiment of this invention, a computer system performs a method for stateless asynchronous message transmission. The method involves a first software application instantiating a listener communication thread for communication with a second process of a second software application. The method also involves receiving an event notification from a sender communication thread, where the event notification contains information identifying an event message. The method also involves suspending the sender communication thread in the second process while the second process continues running, and the sender communication thread remains suspended until a time that the first process decides to send a message to the second process. The method also involves storing a thread identifier of the suspended sender communication thread and the memory address of an event message within the event notification. The method also involves writing information to the suspended sender communication thread during the suspension of the sender communication thread to change values that are provided to the second process of the second software application. Lastly, the method involves resuming the sender communication thread subsequent to writing the information, thereby instructing the second process of the second application to process the written information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
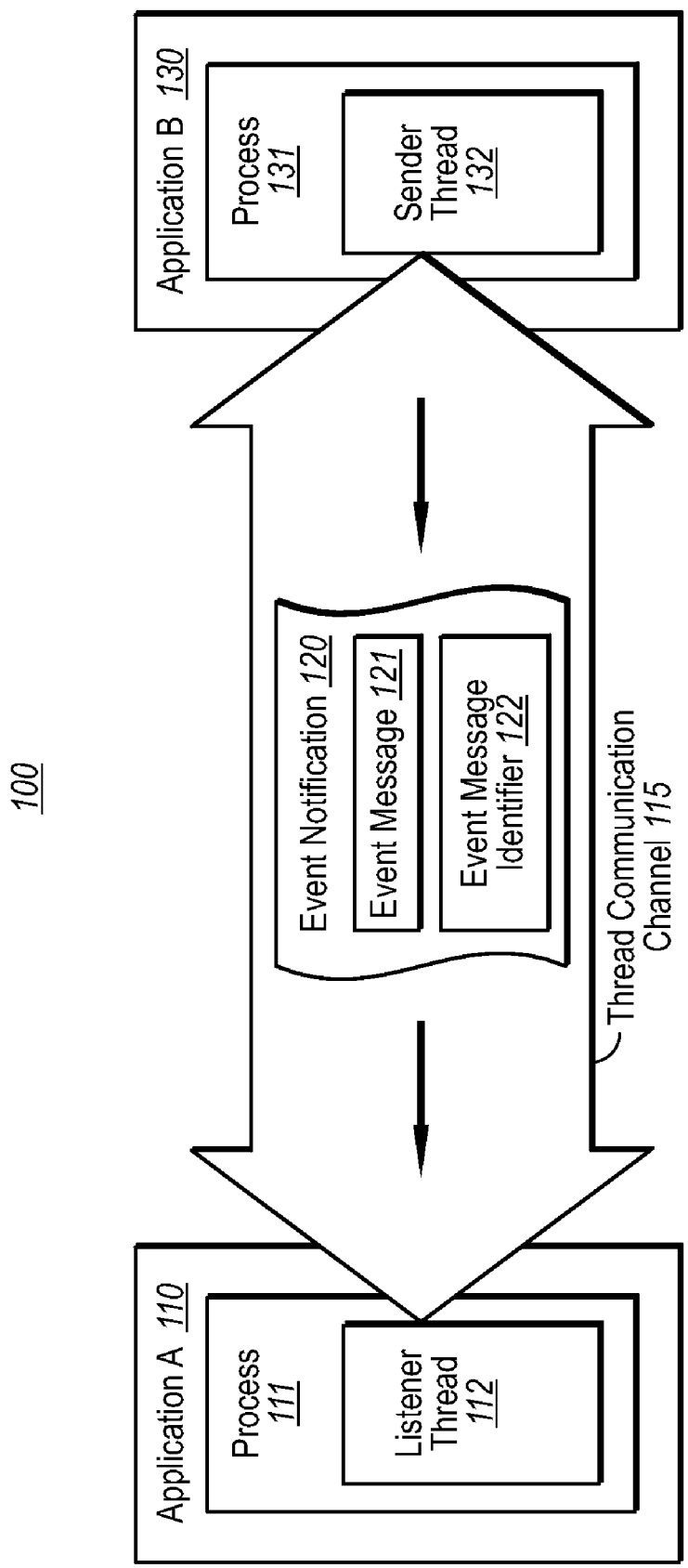
FIG. 1 illustrates a computing environment in which embodiments of the present invention may operate including stateless asynchronous message transmission.

Embodiments of the present invention are directed to systems, methods, and computer program products for stateless asynchronous message transmission. In one embodiment of this invention, a computer system performs a method for stateless asynchronous message transmission. The method involves a first software application instantiating a listener communication thread for communication with a second process of a second software application. The method also involves receiving an event notification from a sender communication thread. The method involves suspending the sender communication thread in the second process while the second process continues running. The method involves storing a thread identifier of the suspended sender communication thread and the memory address of an event message within the event notification. The method involves writing information to the suspended sender communication thread during the suspension of the sender communication thread to change values that are provided to the second process of the second software application. Lastly, the method involves resuming the sender communication thread subsequent to writing the information, thereby instructing the second process of the second application to process the written information.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

FIG. 1 illustrates an environment 100 (e.g., a computer architecture) in which the principles of the present invention may be employed. The environment 100 illustrates two software applications, application A 110 and application B 130. In some embodiments, it may be possible to have more than two software applications. A software application, as used herein, is a program that allows a user to interface with and perform tasks on a computer system. Once instantiated, software applications perform functions by initiating processes. Each process may be capable of starting one or more threads to perform process subroutines. In this manner, using threads and processes, a software application can perform a variety of tasks quickly and efficiently.

In some embodiments, application A 110 may initiate process 111 and application B 130 may initiate process 131. It should be noted that both applications A and B (110 & 130), may have initially been started by a computer system user (not illustrated) or by another application. For example, a computer user may enter a command on a computer system to initiate application A 110. Application A 110 may then initiate Application B 130. Each application may have full control over which processes and threads are initiated, specific to the tasks each application is processing. Alternatively, each application may have varying degrees of control over which process the application is allowed to initiate without user intervention.

In some embodiments, applications A and B (110 & 130) may be able to communicate with each other via thread communication channel 115. For example, application A 110 may initiate process 111. Process 111 may then initiate listener communication thread 112 which can communicate with any of sender thread 132, process 131 or application B 130 via thread communication channel 115. Additionally or alternatively, application B 130 may initiate process 131. Process 131 may then initiate sender thread 132 which can communicate with any of listener thread 112, process 111 or application A 110 via thread communication channel 115.

Environment 100 also includes event notification 120. An event as notification, as used herein, is an item of information used to communicate a message between applications. For example, application B 130 may send an event notification 120 to application A 110 to inform application A that some event has occurred during the processing of process 131. In some embodiments, event notification 120 may include an event message 121 and an event message identifier 122. Event message 121 may contain a buffer which may represent any type of graphical, textual, or other information relating to an event. Event message identifier 122 may be any type of information used to identify event message 121 or the sender of event message 121. For example, event message identifier 122 may include the name, type, size, location, or any other identifying information about the application, the process, or the computer system that sent event notification 120.

Figure 2:
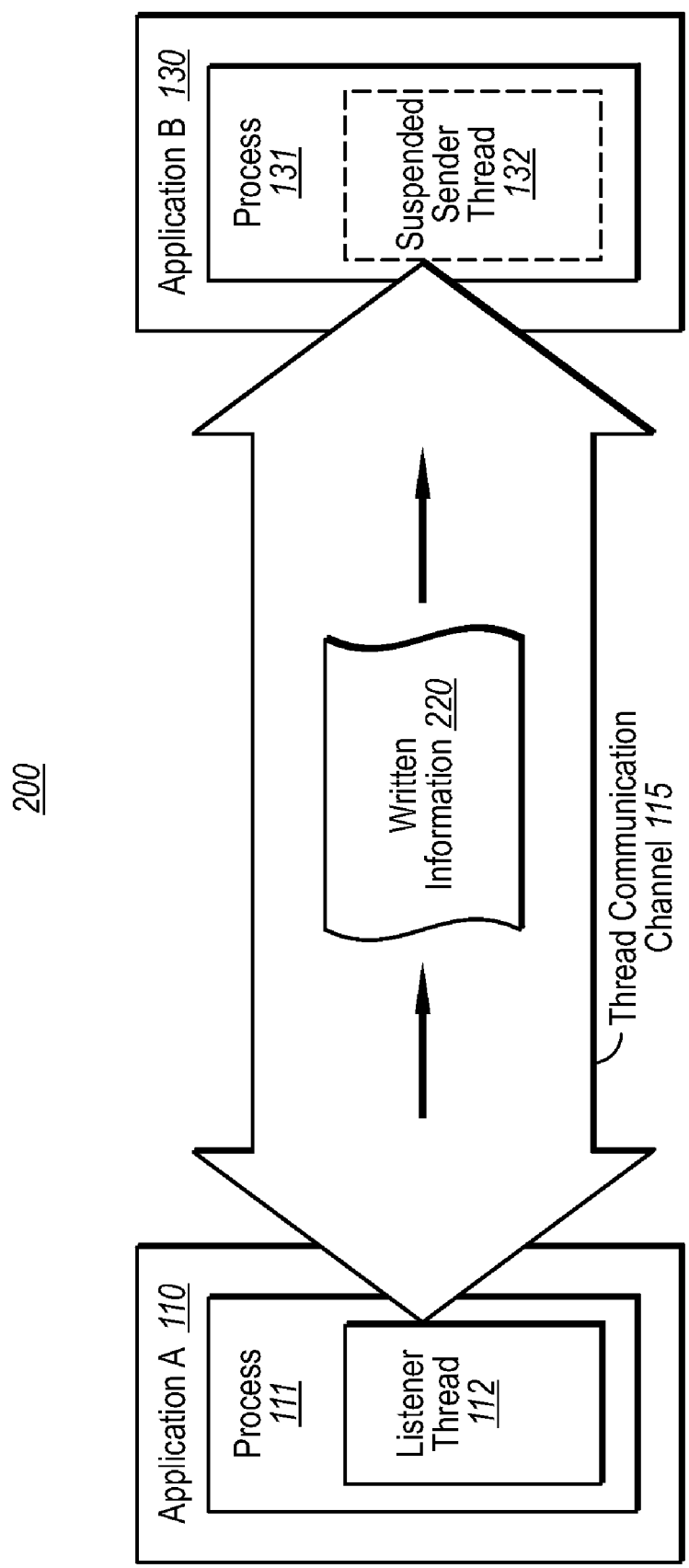
FIG. 2 illustrates a computing environment in which embodiments of the present invention may operate including stateless asynchronous message transmission.

FIG. 2 illustrates an environment 200 (e.g., a computer architecture) in which the principles of the present invention may be employed. The environment 200 will now be described with frequent reference to the components and data of environment 100.

Similar to FIG. 1, FIG. 2 illustrates two software applications (application A 110 and application B 130), two software processes (processes 111 and 131), a listener communication thread 112, a sender communication thread 132 and a thread communication channel 115. However, instead of an event notification 120 (as in one embodiment of FIG. 1), in some embodiments written information 120 may be transmitted via thread communication channel 115. Written information 120 may be any information written by listener communication thread 112. In some embodiments, written information 120 may be used to change values that are provided to process 131 of application B 130.

In some embodiments, listener communication thread 112 may write information 120 to suspended sender thread 132. For example, listener thread 112 may have sufficient security permissions to suspend and resume a thread such as sender thread 132. FIG. 2 illustrates sender thread 132 as suspended. However, it should be noted that listener thread 112 may resume sender thread 132 at any time, whether listener thread 112 wrote to sender thread 132 or not. In some embodiments, listener thread 132 may write directly to suspended sender thread 132 via thread communication channel 115. Furthermore, in some cases, sender thread 132 may lack security permissions to access process 111. Moreover, in some cases, sender thread 132 may be unaware of the existence of the listener thread 112. Thus, in such cases, listener thread 112 may operate without sender thread 132 having access to or even being aware of other threads or processes.

Figure 3:
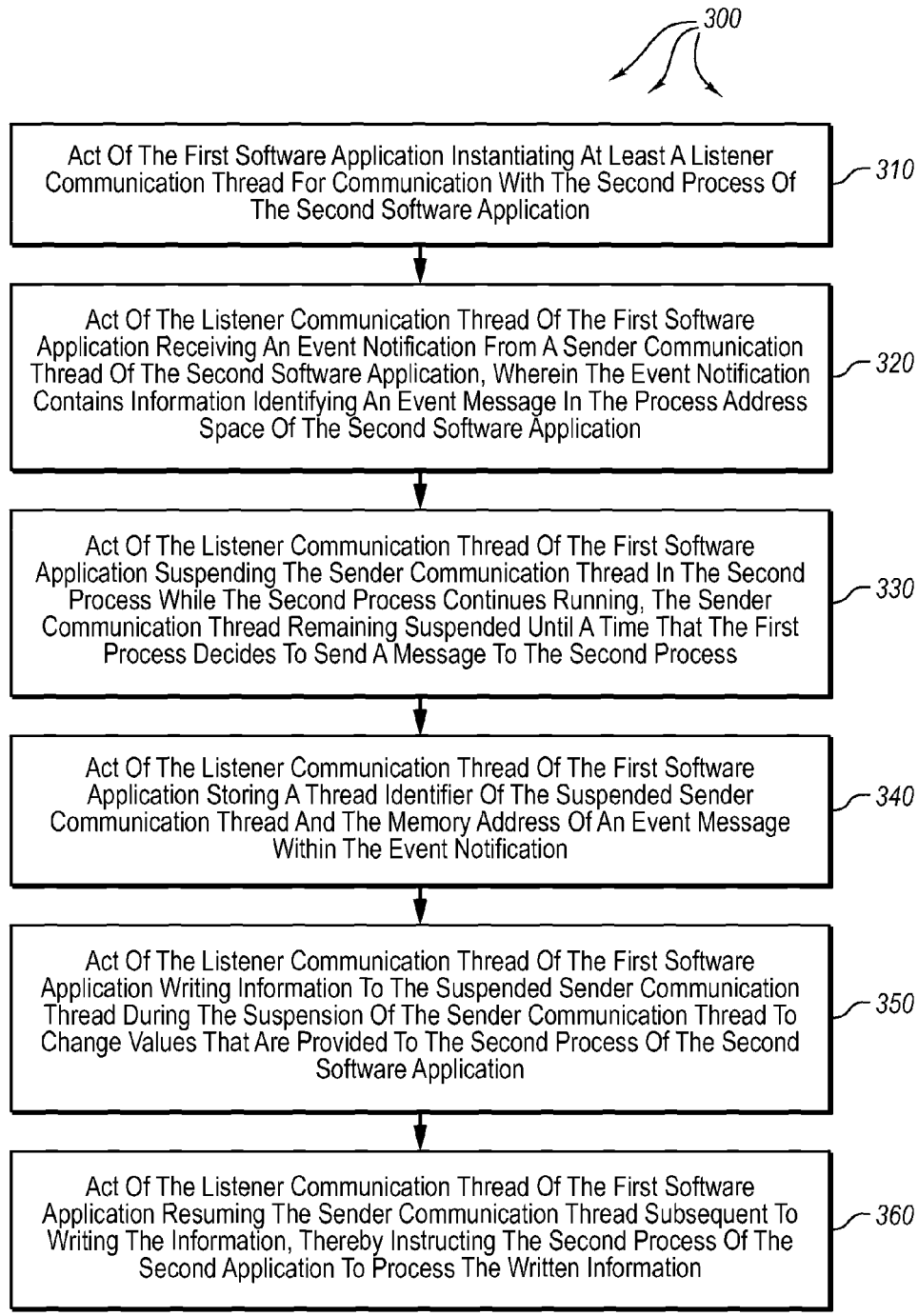
FIG. 3 illustrates a flowchart of an embodiment of a method for stateless asynchronous message transmission.

FIG. 3 illustrates a flowchart of a method 300 for stateless asynchronous message transmission. The method 300 will now be described with frequent reference to the components and data of environments 100 and 200.

Method 300 includes an act of the first software application instantiating at least a listener communication thread for communication with the second process of the second software application (act 310). For example, application A 110 may instantiate listener communication thread 112 for communication with process 131 in application B 130. Application A may be any type of software application and may instantiate any number of processes and/or threads. The number of processes and/or threads may correspond to the number of tasks that need to be performed. Threads and processes may each be used by a software application (e.g. application A 110) to perform routines and subroutines within the application.

Method 300 also includes an act of the listener communication thread of the first software application receiving an event notification from a sender as communication thread of the second software application, wherein the event notification contains information identifying an event message in the process address space of the second software application (act 320). For example, listener communication thread 112 may receive event notification 120 from sender communication thread 132, wherein event notification 120 may contain an event message identifier in the process address space of application B 130. Thread communication channel 115 may be used to communicate directly between process 111 and process 131. Additionally or alternatively, thread communication channel 115 may be used to communicate directly between listener thread 112 and sender thread 132.

In some embodiments, communication between applications or processes may be managed by the operating system. Operating systems allow software applications to interact with computer system hardware such as network cards, modems, and other physical means of communicating with another computer system. Thus, in some embodiments, application A 110 and application B 130 may be on separate computer systems, using thread communication channel 115 to communicate. Or alternatively, application A 110 and application B 130 may be on the same computer system, using thread communication channel 115 to communicate. Thread communication channel 115 may facilitate both local and remote communication between applications.

In some embodiments, communication between applications A and B (110 & 130) may be asynchronous. Asynchronous communication is communication where the transmitter and receiver are independent and are not synchronized. Synchronized communication involves one computer system connecting to another, sending a request and waiting for a reply. One example of synchronous communication is Hypertext Transfer Protocol (HTTP). An internet browser application transmits a request for a web page and waits for the web server to respond. Asynchronous communication, however, allows the transmitter and receiver to send or receive at any time, without having to wait for a response. The transmitter and receiver are independent and are not synchronized to any external clock.

Thus, in one example, sender thread 132 running in application B 130 may be able to send event notification 120 to listener thread 112 via thread communication channel 115. Because the communication is asynchronous, sender thread 132 does not have to wait for a response before it can move on to other processing. Similarly, listener thread 112 does not have to remain idle, waiting for an event notification 120. The notification 120 may arrive asynchronously and listener thread 112 may still be able to receive the notification 120.

Furthermore, communication between applications A and B (110 & 130) may be stateless. Stateless communication involves a system which does not keep a persistent state between transactions. For example, a World Wide Web (WWW) server receives Uniform Resource Locators (URLs) and can process the requests without any memory of previous requests. Also, stateless communicators such as WWW servers do not have to allocate storage to deal with current transactions or release the storage if a client is dropped during the transaction. In this case, application A 110 may communicate with application B 130 in a stateless manner where neither application maintains any memory of previous requests or stores resources regarding the current transmission. Thus, communication between application A 110 and application B 130 may be both stateless and asynchronous.

Method 300 also includes an act of an act of the listener communication thread of the first software application suspending the sender communication thread in the second process while the second process continues running, the sender communication thread remaining suspended until a time that the first process decides to send a message to the second process (act 330). For example, listener communication thread 112 may suspend sender communication thread 132 while process 131 continues running and sender thread 132 remains suspended until process 111 decides to send a message to process 131. As explained above, event message 121 may contain a buffer representing any type of graphical, textual, or other information related to an event. Event message identifier 122 may be any type of information used to identify the event message 121 or the sender of the event message. For example, event message identifier 122 may include the name, type, size, or any other identifying information about the application, the process, or the computer system that sent event notification 120. Event notification 120 may also include event message 121.

In some embodiments, listener communication thread 112 may have sufficient security permissions to suspend, resume and/or write to sender thread 132. In one embodiment, listener thread 112 may suspend sender thread 132 (as illustrated in FIG. 2) until process 111 decides to send a message to process 131. It should be noted that either process (111 or 131), thread (112 or 132) or application (110 or 130) may send information (e.g. a message) over thread communication channel 115. Thus, the smaller arrows illustrated in FIGS. 1 & 2 are illustrative of one embodiment and should not be construed as limiting the direction of travel between applications, processes, or threads. Furthermore, it should be noted, as mentioned above, that applications A & B (110 & 130) may be capable of instantiating more than one process and each process may be capable of initiating more than one thread. Thus, in some embodiments, each process may have a plurality of threads such as sender threads, listener threads and other types of threads.

Method 300 also includes an act of the listener communication thread of the first software application storing a thread identifier of the suspended sender communication thread and the memory address of an event message within the event notification (act 340). For example, listener communication thread 112 may store a thread identifier of suspended sender thread 132. In some embodiments, application A may be a debugging application (debugger) and application B may be an application that is being debugged (debuggee). The debugger may be able to suspend sender communication thread 132 after receiving event notification 120 from the debuggee. In other embodiments, eventing may be used to debug application B 130 (the debuggee) built on a debugging pipeline between application A 110 and application B so as to simplify application B's responsibilities during debugging. Eventing may include any type of communication whereby an application, thread or process notifies another application, thread or process of an event.

Method 300 also includes an act of the listener communication thread of the first software application writing information to the suspended sender communication thread during the suspension of the sender communication thread to change values that are provided to the second process of the second software application (act 350). For example, listener communication thread 112 may write information to suspended sender thread 132 during the suspension of sender thread 132 to change values that are provided to process 131. In this manner, application A 110 may be able to write to a thread (e.g. sender thread 132) in application B 130 during the suspension thread 132. Other threads and processes may still be running during the writing process. In some embodiments, the thread identifier may be used to identify which threads are suspended, which threads have been written to, and/or which threads should be resumed.

Method 300 also includes an act of the listener communication thread of the first software application resuming the sender communication thread subsequent to writing the information, thereby instructing the second process of the second application to process the written information (act 360). For example, listener communication thread 112 may resume sender communication thread 132 subsequent to writing the information, thereby instructing process 131 to process the written information. For instance, in the example above where application A 110 is a debugger and application B 130 is a debuggee, after sender thread 132 is suspended the debugger may write information to suspended sender thread 132 of the debuggee. This information may be any type of information relative to an event or that may be used to change values in another process or application (e.g. process 131 or application B 130). Then after the information is written, for example, listener thread 112 may resume sender thread 132 and thereby allow process 131 to process the written information 220. Processing written information 220 may include changing, comparing or otherwise processing values, data structures or other data within the application (e.g. application B 130).

Thus, in some embodiments, method 300 may provide a means for stateless asynchronous message transmission between two software applications. Application A 110 may initiate process 111 which may, in turn, initiate listener communication thread 112 to communicate to sender communication thread 132 within process 131 and application B 130. Application A 110 (through listener thread 112) may suspend thread 132 and write information to sender thread 132 while thread 132 is suspended. Then, after writing to sender thread 132, application A (through listener thread 112) may resume sender thread 132.

Figure 4:
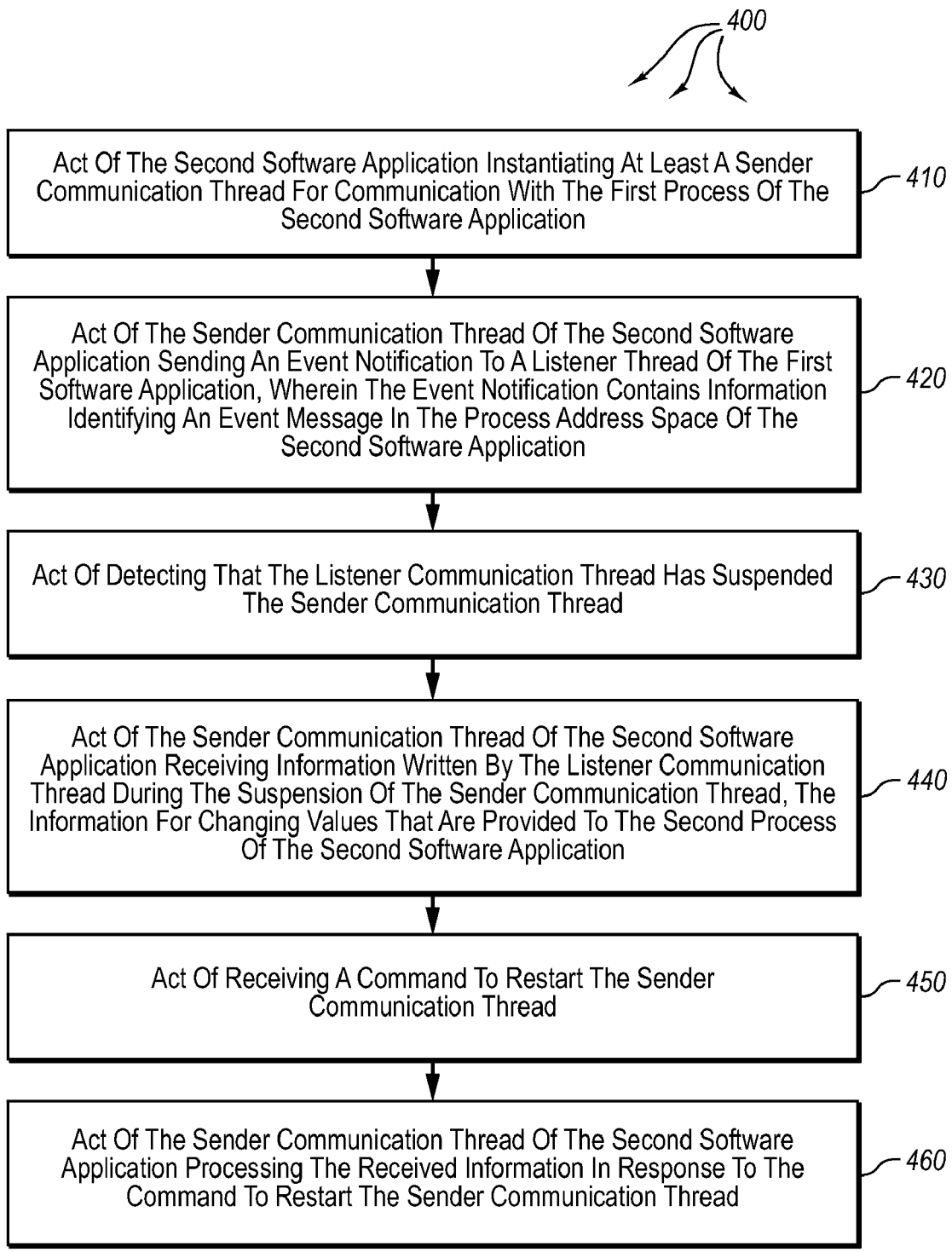
FIG. 4 illustrates a flowchart of an embodiment of a method for stateless asynchronous message transmission.

FIG. 4 illustrates a flowchart of a method 400 for stateless asynchronous message transmission. The method 400 will now be described with frequent reference to the components and data of environments 100 and 200.

Method 400 includes an act of the second software application instantiating at least a sender communication thread for communication with the first process of the first software application (act 410). For example, application B 130 may instantiate sender communication thread 132 for communication with process 111 of application A 110. As mentioned above, application B 130 may instantiate any number of processes and, in turn, these processes may initiate any number of threads.

Method 400 also includes an act of the sender communication thread of the second software application sending an event notification to a listener thread of the first software application, wherein the event notification contains information identifying an event message in the process address space of the second software application (act 420). For example, sender communication thread 132 may send event notification 120 to listener communication thread 112, wherein event notification 120 contains event message identifier 122 in the process address space of application B 130. As mentioned above, event notification 120 may include event message 121 and/or event message identifier 122. In some embodiments, event notification 120 may be used to notify another thread/process/application that an event has occurred. An event may be an acknowledgement that something has occurred, for example, that a subroutine of a process has completed or has terminated because of an error.

Method 400 also includes an act of detecting that the listener communication thread has suspended the sender communication thread (act 430). For example, application B 130 may detect that listener communication thread 112 has suspended sender communication thread 132. In one embodiment, it may be beneficial for application B 130 to know when one or more threads have been suspended so that application B 130 will not attempt to use those threads while they are suspended.

Method 400 also includes an act of the sender communication thread of the second software application receiving information written by the listener communication thread during the suspension of the sender communication thread, the information for changing values that are provided to the second process of the second software application (act 440). For example, sender communication thread 132 may receive written information 220 from listener communication thread 112 during suspension of sender thread 132, where information 220 is for changing values that are provided to process 131 of application B 130. As explained above, information 220 may be any type of information relative to an event or that may be used to change values in another process or application (e.g. process 131 or application B 130).

Method 400 also includes an act of receiving a command to restart the sender communication thread. For example, application B 130, process 131 or sender thread 132 may receive a command from another thread, process or application to restart sender thread 132. In this manner, communication between, for example, sender thread 132 and listener thread 112 may be asynchronous (i.e. sender thread 132 may be suspended and restarted at any time upon receiving the appropriate commands).

Method 400 also includes an act of the sender communication thread of the second software application processing the received information in response to the command to restart the sender communication thread (act 460). For example, sender communication thread 132 may process received written information 220 in response to a command to restart sender thread 132. As explained above, in some embodiments processing written information 220 may include changing, comparing or otherwise processing values, data structures or other data within the application (e.g. application B 130).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system where a first process has been instantiated by a first software application and a second process has been instantiated by a second software application, a method for asynchronous communication between the first software application and the second software application, the method comprising:
the first software application instantiating at least a listener communication thread for communication with the second process of the second software application;
the listener communication thread of the first software application receiving an event notification from a sender communication thread of the second software application, the event notification containing information identifying an event message in a process address space of the second software application;
the listener communication thread of the first software application suspending the sender communication thread in the second process;
the second process continuing to run during the suspension of the sender thread;
the sender communication thread remaining suspended until receiving a message to resume from the first process;
the listener communication thread storing a thread identifier of the suspended sender communication thread and a memory address of an event message within the event notification;
the listener communication thread writing information to the suspended sender communication thread during the suspension of the sender communication thread, the written information changing values that are provided to the second process of the second software application;
the listener communication thread causing the sender communication thread to resume subsequent to writing the information; and
the listener communication thread instructing the second process of the second application to process the written information.

2. The method of claim 1, wherein communication between the first and second software applications comprises asynchronous communication where the transmissions of the first software application and of the second software application are independent and lack synchronization to an external clock.

3. The method of claim 1, wherein communication between the first and second software applications comprises stateless communication where neither application maintains any memory of previous requests or stores resources regarding any current transmission.

4. The method of claim 1, wherein the first software application and the second software application are on separate computer systems and are configured to communicate remotely.

5. The method of claim 1, wherein the event message comprises a buffer which represents textual, graphical, or other information relating to an event.

6. The method of claim 1, wherein the information identifying the event message comprises a name, type, size, location or other identifying information about the application, the process, or the computer system that sent event notification.

7. The method of claim 1, further comprising using thread identifiers to identify which threads were suspended, which threads were written to, and which threads are to be resumed.

8. The method of claim 1, wherein the first software application comprises a debugging application.

9. The method of claim 1, wherein the second software application comprises an application that is being debugged.

10. The method of claim 1, wherein the listener communication thread has sufficient security permissions to suspend, resume, and write to the sender communication thread.

11. The method of claim 1, wherein the sender communication thread lacks security permissions to access the first process.

12. The method of claim 1, wherein the sender communication thread is unaware of the existence of the listener communication thread.

13. A computer program product for use at a computer system, the computer program product for implementing a method for stateless asynchronous message transmission, the computer program product comprising one or more computer-readable storage media having stored thereon computer-executable instructions that, when executed by one or more processors of the computer system, cause the computer system to perform a method comprising:
a first software application instantiating at least a listener communication thread for communication with a second process of a second software application;
the listener communication thread of the first software application receiving an event notification from a sender communication thread of the second software application, the event notification containing information identifying an event message in a process address space of the second software application;
the listener communication thread of the first software application suspending the sender communication thread in the second process;
the second process continuing to run during the suspension of the sender thread;
the sender communication thread remaining suspended until receiving a message to resume from the first process;
the listener communication thread storing a thread identifier of the suspended sender communication thread and a memory address of an event message within the event notification;
the listener communication thread writing information to the suspended sender communication thread during the suspension of the sender communication thread: the written information changing values that are provided to the second process of the second software application;
the listener communication thread causing the sender communication thread to resume subsequent to writing the information and;
the listener communication thread instructing the second process of the second application to process the written information.

14. The computer program product of claim 13, wherein communication between the first and the second software applications comprises asynchronous communication where the transmissions of the first software application and of the second software application are independent and lack synchronization to an external clock.

15. The computer program product of claim 13, wherein communication between the first and the second software applications comprises stateless communication where neither application maintains any memory of previous requests or stores resources regarding any current transmission.

16. The computer program product of claim 13, wherein the first software application and the second software application are on separate computer systems and are configured to communicate remotely.

17. The computer program product of claim 13, wherein the first software application comprises a debugging application and the second software application comprises an application that is being debugged, eventing used to debug the second software application built on a debugging pipeline between the first software application and the second software application so as to simplify the second software application's responsibilities during debugging.

* * * * *